W. McMICHAEL.

LOOSE REED MOTION FOR POWER LOOMS.

No. 11,493. Reissued May 7, 1895.

Witnesses.
A. D. Harrison.
Rollin Abell.

Inventor.
William McMichael
by Wright Brown & Quinby
Attys.

UNITED STATES PATENT OFFICE.

WILLIAM McMICHAEL, OF WOONSOCKET, RHODE ISLAND, ASSIGNOR TO THE WOONSOCKET MACHINE AND PRESS CORPORATION, OF SAME PLACE.

LOOSE-REED MOTION FOR POWER-LOOMS.

SPECIFICATION forming part of Reissued Letters Patent No. 11,493, dated May 7, 1895.

Original No. 508,041, dated November 7, 1893. Application for reissue filed July 2, 1894. Serial No. 516,396.

*To all whom it may concern:*

Be it known that I, WILLIAM McMICHAEL, of the city of Woonsocket, in the county of Providence and State of Rhode Island, have invented a new and useful Improvement in Loose-Reed Motions for Power-Looms, of which the following is a full, clear, and exact description.

The object of my invention is to provide a power loom of the ordinary construction for weaving cloth, with an improved loose-reed motion, the said improvements consisting of a reed having the top stationary in the lay and the bottom movable under pressure backward and forward in the lay in the direction of its line of movement, but independent thereof, whereby the forward movement of the bottom of the reed will be instantly stopped when striking an obstruction in the shed, such for instance as a shuttle caught therein, though the lay itself continues its forward movement, thereby preventing a break in the warp threads, combined with improved means for automatically locking the reed fast in the lay immediately before the termination of its forward movement, and for automatically unlocking the same during its return or backward, and for a great part of its forward movement, all as is hereinafter fully described and claimed.

The existing defect in power looms sought to be overcome by my invention is that, in the operation of the loom constructed with the reed secured immovably in the lay, it will frequently happen that through some defective operation of the shuttle boxes or other parts of the loom, or through the carelessness of the weaver, one or more shuttles will fail to enter the boxes, and become caught in the shed and struck by the advancing reed, resulting in what is called a "smash," that is, an extensive breaking of the warp threads, thereby causing serious damage. The use of my invention absolutely prevents these "smashes."

The accompanying drawings illustrate my invention.

Figure 1:
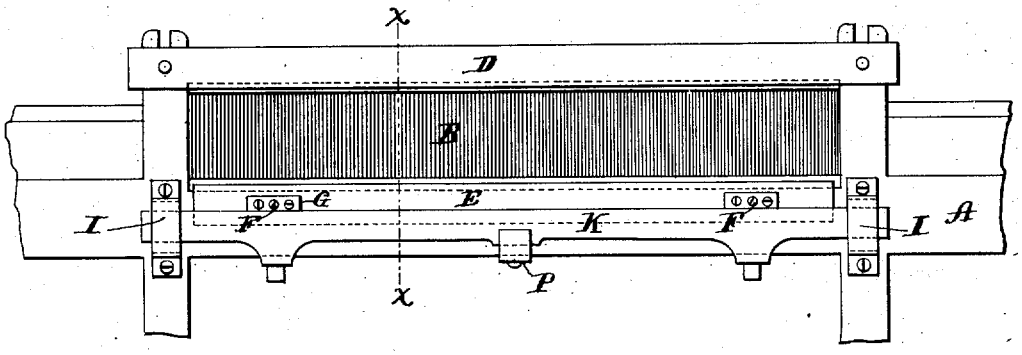
Figure 2:
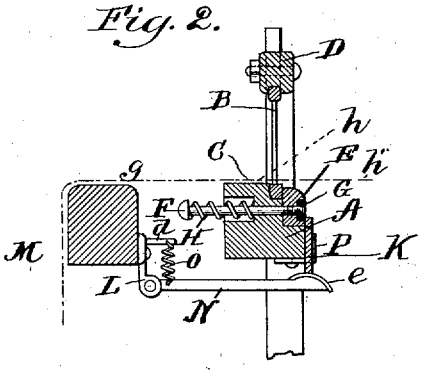
Figure 3:
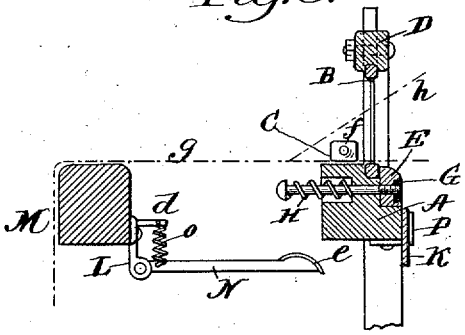
Figure 4:
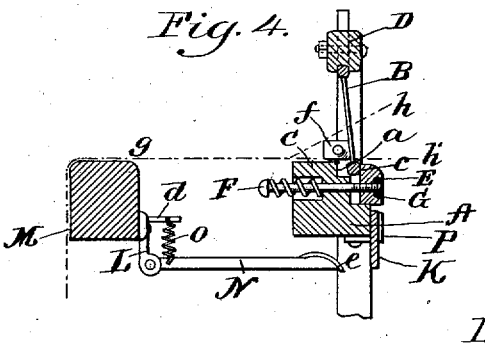

Figure 1 is a rear elevation of the lay and reed, showing the reed locked in the lay. Fig. 2 is a transverse section taken through Fig. 1 on line *x x*, showing the reed locked and in the position of beating up the weft. Fig. 3 is a transverse section taken through Fig. 1 on the same line, showing the reed unlocked and the shuttle on its passage through the shed. Fig. 4 is a transverse section taken through Fig. 1 on the same line, showing the reed unlocked and the shuttle caught in the shed.

Similar letters indicate corresponding parts throughout the several views.

A indicates the body of the lay of an ordinary power loom, carrying the reed B. Its upper surface C constitutes the shuttle race for the passage of the shuttle in picking from and to the shuttle boxes. A longitudinal groove, *a*, is made in the back side of the lay to receive the lower side bar of the reed.

B is the reed, its upper side bar resting loosely in groove *b* in the under side of the reed cap D which constitutes the top of the lay. The lower side bar of the reed rests in, and is partially embraced by, the longitudinal groove *a* in the back side of the body of the lay.

E is a movable stay block resting within a recess in the back side of the body of the lay close behind the reed, and is provided with a longitudinal groove *c* in the side next to, and adapted to receive and partially embrace the lower side bar of the reed, and, together with the body of the lay, holding it between them. The back side of the stay block is flush with the back side of the lay.

F F are threaded guide bolts extending through the body of the lay and into the stay block and work into threaded plates G G let into the back of the stay block and immovably attached thereto by screws or other suitable means. The guide bolts serve to guide the forward and backward movement of the stay block hereinafter described. An open coil steel wire spring H surrounds each of the bolts F F, one end thereof resting against the inner side of the bolt head and the other against a shoulder within the body of the lay. The force of the springs holds the stay block against the reed, thus holding the reed in its position in the lay in the operation of the loom.

I I are slotted guides firmly secured to the back side of the lay, one at either end, and adapted to receive the ends of the locking plate and to permit them to slide up and down within the slots.

K is a locking plate having its ends shaped and adapted to fit in and slide up and down in guides I I.

*e e* indicate cams, formed upon the upper side of a pair of movable arms or levers N at their outer ends, the other ends of the levers being pivoted to brackets L which are rigidly attached to the inner side of the breast beam M. The levers are held in a horizontal position by coil springs O, one end thereof being attached to lugs *d* projecting from the brackets, and their other ends attached to the levers. The cams *e e* are adapted to engage with the under side of the locking plate K as the lay moves forward and thereby slide the locking plate upward and in rear of the stay block, thus locking the reed immovably in the lay. This locking movement is effected immediately before the lay finishes its forward movement.

P is a supporting bracket attached to the under surface of the body of the lay, one or more of which may be used or not as desired. The said part P is designed to support the locking plate K against the shock of beating up the weft when the weakness of the parts render such support desirable.

The dotted line *g* indicates the cloth woven, and the dotted lines *h* and *h'* indicate the warp threads forming the shed.

*f* indicates the shuttle, and is shown in Fig. 4 of the drawings as caught in the shed, and in which the reed is shown as stopped in its forward movement by the shuttle, and the lay as moved onward.

The operation is as follows: When the power is applied the lay moves forward carrying the reed to beat up the weft. The reed is held in its position in the lay by the force of springs H operating upon the guiding bolts F F. If the reed meets no obstruction the under edge of the locking plate K strikes upon the stationary cams *s e*, located upon the levers N, and the locking plate is thereby lifted and moved upward close against the back side of the stay block E, whereby the reed is immovably locked in the lay immediately before the reed completes its forward movement, and beats up the weft. During its return or backward movement the locking plate moves off the cams *e e* and drops down, and the reed becomes again unlocked. If, during the forward movement of the lay and reed, one or more shuttles fail for any reason to enter the boxes and are caught in the shed, as shown in Fig. 4 of the drawings, the springs H yield to the superior resisting force of the shuttle held within the shed, and the forward movement of the lower part of the reed is instantly stopped and a serious break in the warp is thereby prevented, while the lay continues its forward movement for a short distance until it, too, is stopped by other mechanism not necessary to be herein described. Upon the shuttle being released the lower part of the reed is moved forward into its place under the influence of springs H. The springs O are of sufficient tension to hold the levers N rigidly in the operation of lifting the locking plate above described, but if for any reason the lay should not be stopped in its forward movement when the shuttle is caught in the shed as above described, the locking plate would be prevented from rising by reason of the stay block resting above it, and the under edge of the locking plate will, therefore, upon striking the cams *e e*, overcome the resistance of springs O and depress the levers N.

Having thus explained the nature of the invention and described a way of constructing and using the same, though without attempting to set forth all of the forms in which it may be made or all of the modes of its use, it is declared that what is claimed is—

1. A loose reed-motion for looms, comprising in its construction a lay, the reed movably supported thereby, a sliding stay-block yieldingly held against the lay, a sliding plate for locking the stay-block in place when the shed is free and the reed is moved forward to beat up the weft, and a cam yieldingly supported to force the sliding plate into its unobstructed locking position or to be moved by said plate when movement of the latter into its locking position is prevented, substantially as and for the purpose set forth.

2. A loose reed-motion for looms comprising in its construction a lay, the reed movably supported thereby, devices, substantially as set forth, for locking the reed in place when it moves forward to beat up the weft and the shed is free, and yielding to allow the reed to move back when an obstruction is met in the shed, and a cam yieldingly supported to force the sliding plate into its unobstructed locking position or to be moved by said plate when movement of the latter into its locking position is prevented, substantially as and for the purpose set forth.

3. The lay in combination, with the movable reed B, of stay block E provided with threaded plates G, G, guide bolts F F passing through the body of the lay and engaging with the threaded plates, the springs H H surrounding bolts F F and holding the stay block against the reed, guides or ways I I, locking plate K having its ends adapted to slide up and down in said guides or ways, the arms or levers N N attached to the breast beam M, and cams *e e* respectively located upon said arms or levers and adapted to engage with the under side of the locking plate K and to raise and lower the same, thus locking and unlocking the reed during the forward and backward movement of the lay, substantially as described.

4. The lay A, in combination with the movable reed B, stay block E provided with threaded plates G G, guide bolts F F passing through the body of the lay and engaging with the threaded plates, springs H H surrounding bolts F F and holding the stay block against the reed and thereby holding the reed in position in the lay, guides or ways I I, locking plate K having its ends adapted to slide up and down in said guides or ways, the arms or levers N N pivoted to the breast beam M, lugs *d d*, springs O O attached to the lugs and supporting the arms or levers, and cams *e e* attached to the arms or levers and adapted to engage with the under side of locking plate K and to raise and lower the same, thereby locking and unlocking the reed during the forward and backward movement of the lay, substantially as described.

WILLIAM McMICHAEL.

Witnesses:

C. F. BROWN,

A. D. HARRISON.